No. 763,850. PATENTED JUNE 28, 1904.
O. B. BURROUGHS.
TRAP.
APPLICATION FILED JAN. 27, 1904.
NO MODEL.

WITNESSES:
Geo. Ackman Jr.
Herbert D. Lawson.

INVENTOR
Oliver B. Burroughs,
BY
Victor J. Evans
Attorney

No. 763,850. Patented June 28, 1904.

UNITED STATES PATENT OFFICE.

OLIVER B. BURROUGHS, OF NORFOLK, VIRGINIA.

TRAP.

SPECIFICATION forming part of Letters Patent No. 763,850, dated June 28, 1904.

Application filed January 27, 1904. Serial No. 190,874. (No model.)

*To all whom it may concern:*

Be it known that I, OLIVER B. BURROUGHS, a citizen of the United States, residing at Norfolk, in the county of Norfolk and State of Virginia, have invented new and useful Improvements in Traps, of which the following is a specification.

My invention relates to new and useful improvements in fish-traps; and its object is to provide a simple and inexpensive device of this character which is adapted to be submerged within a body of water and which has inlets through which fish may pass to the interior of the trap, but from which it is impossible for them to escape.

Another object of the invention is to provide means for directing fish toward the inlets.

With the above and other objects in view the invention consists of a cage having frustoconical inlets at the ends thereof, each of said inlets being surrounded by inwardly-extending prongs. Arranged at opposite sides of the other inlet are wings which extend outward at inclines and serve to guide fish toward the inlet.

The invention also consists in the further novel construction and combination of parts hereinafter more fully described and claimed, and illustrated in the accompanying drawings, showing the preferred form of my invention, and in which—

Figure 1:
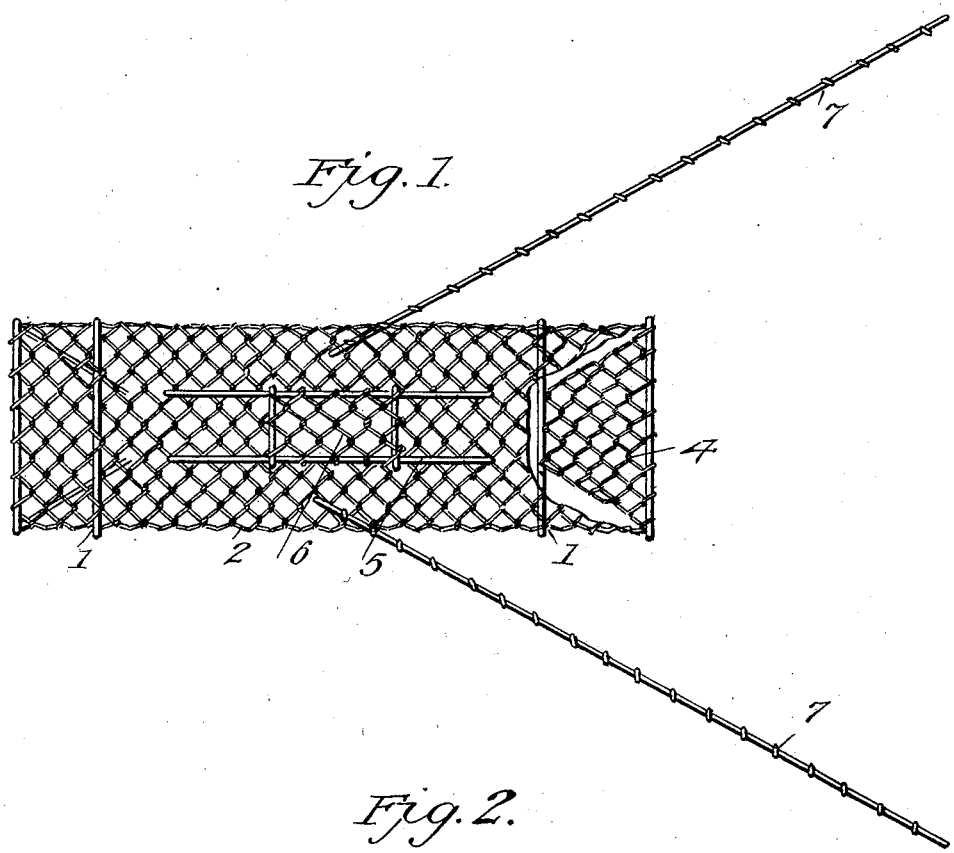
Figure 2:
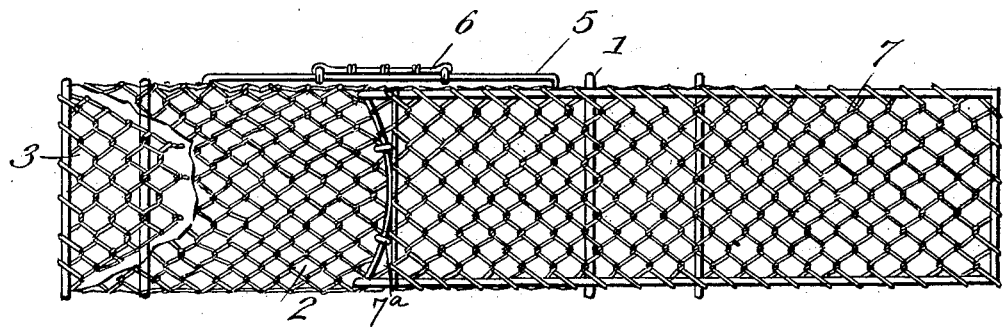

Figure 1 is a plan view of the trap, a portion of one end thereof being broken away. Fig. 2 is a side elevation thereof with a portion of the other end broken away.

Referring to the figures by numerals of reference, 1 1 are hoops or bands, to which is secured a fabric 2, which forms the body of the trap, and extending inwardly from one end of this body is a frusto-conical inlet 3, also formed of fabric. A similar frusto-conical inlet 4 is formed at the other end of the body, and secured to the top of the body between the inlets are parallel rods 5, on which is slidably mounted a fabric closure 6, adapted to extend over an outlet formed within the top of the body. Panels 7, of fabric, preferably similar to that employed in the formation of the body 2, are secured to opposite sides of said body and extend therefrom, so as to form converging guides for directing fish contacting therewith toward the inlet 4.

The entire trap is formed of galvanized metal or other non-corrodible material, and the fabric used is preferably as large as can be employed for this purpose.

In using the trap the same is submerged, and the fish upon coming in contact with the panels 7 will be directed thereby toward the inlet 4, through which they can readily pass into the body 2. The fish, however, cannot pass outward through the inlets, because of the peculiar contour thereof. After a desired number of fish have been collected within the body 2 the same can be removed by sliding the closure 6 along the rods 5, so as to open the outlet.

The inner ends of the panels 7 are curved, as shown in Fig. 2, and are pivotally connected to the sides of the body 2 by means of loops $7^a$, whereby the panels are permitted to assume any desired angles in relation to the sides of the body. This feature renders the device especially adaptable for use in tidewater streams where the current moves in opposite directions alternately. When the trap is placed in water where there is no current, the panels can be extended at right angles to the body, so as to guide fish into both ends of the trap.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. A fish-trap formed of non-corrodible fabric and comprising hoops, fabric secured upon the hoops and forming a body having an outlet, parallel longitudinally-extending rods secured to the body adjacent the outlet, a closure slidably mounted on the rods, frusto-conical inlets at opposite ends of the body and projecting thereinto, and converging fabric panels secured to opposite sides and projecting past one end of the body.

2. A fish-trap formed of non-corrodible fabric and comprising hoops, fabric secured upon the hoops and forming a body having an outlet, parallel longitudinal rods secured to the body adjacent the outlet, a closure slidably mounted on the rods, and frusto-conical inlets at opposite ends of the body and projecting thereinto and converging fabric panels pivoted to opposite sides of the body.

In testimony whereof I affix my signature in presence of two witnesses.

OLIVER B. BURROUGHS.

Witnesses:
  SAML. D. LOCKE, Jr.,
  CHAS. E. SIMPSON.